Dec. 11, 1956 — H. S. YOUNG — 2,773,500
INTRAOSSEOUS FLUID INJECTION INSTRUMENT
Filed Jan. 26, 1955 — 2 Sheets-Sheet 1
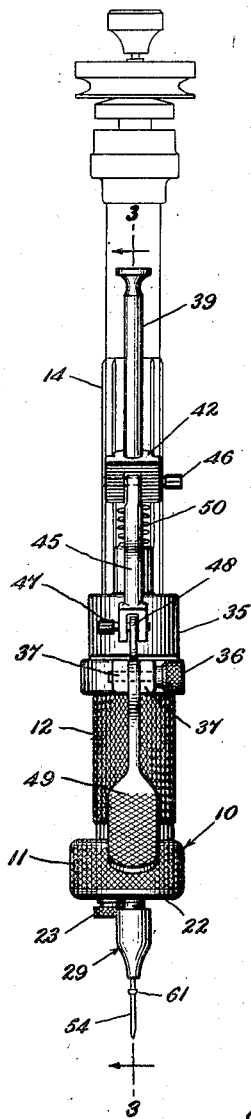
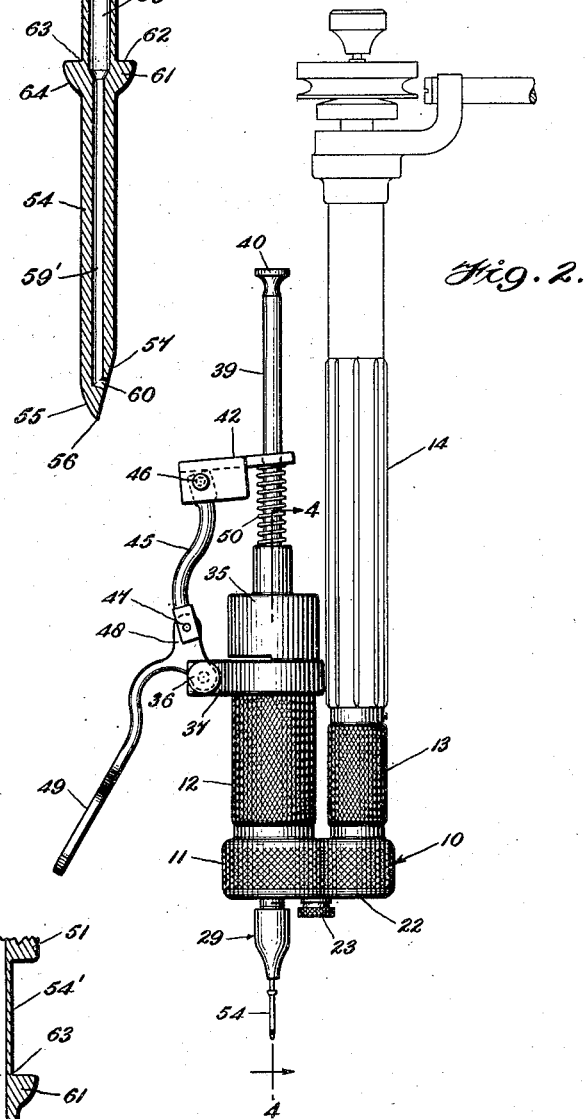
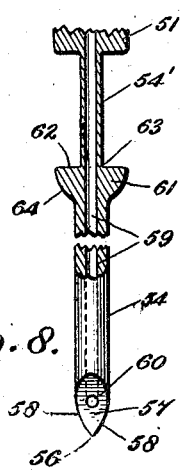
INVENTOR
Harold S. Young,
BY
ATTORNEY

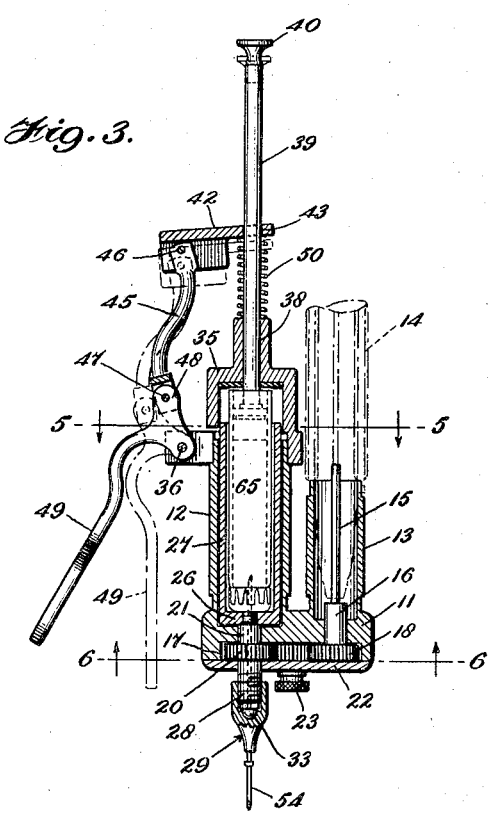
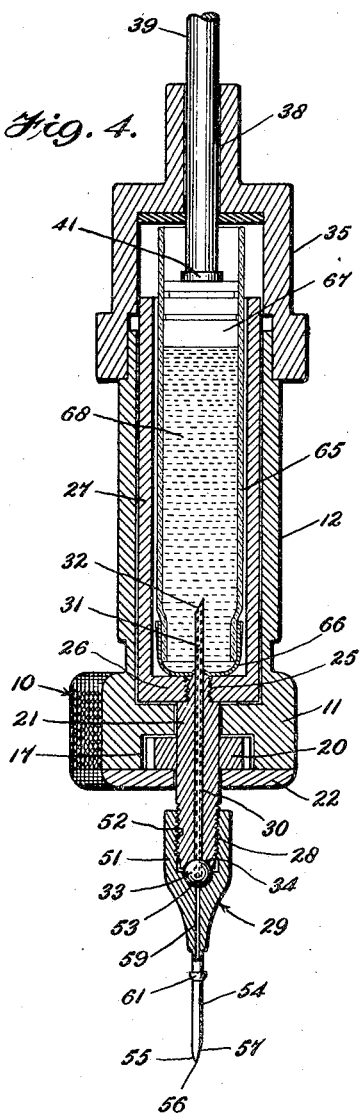
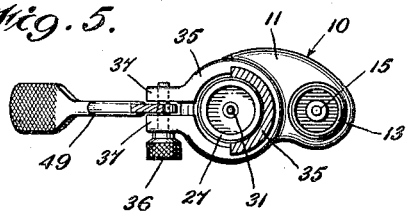
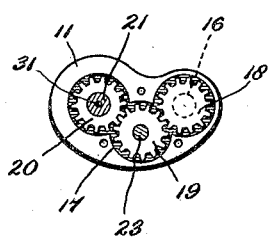

United States Patent Office 2,773,500
Patented Dec. 11, 1956

2,773,500

INTRAOSSEOUS FLUID INJECTION INSTRUMENT

Harold S. Young, Washington, D. C.

Application January 26, 1955, Serial No. 484,136

9 Claims. (Cl. 128—218)

This invention relates to dental instruments and has for its principal object the provision of an improved device which, while primarily intended for use in effecting intraosseous anesthesia preliminary to the performance of various dental operations, may also be advantageously employed for the introduction of antibiotics, sulfonomides or other medicaments into the soft medullary section of the bone for therapeutic and analogous purposes. However, the invention will be herein described in connection with its primary object, i. e., intraosseous anesthesia of teeth.

This type of anesthesia has been known for some fifty years, and is the most rapid and certain method of securing anesthesia of the dental pulp or nerve tissue of teeth, but notwithstanding the recognized advantages thereof its use has been relatively limited, due largely to the fact that it has been somewhat more difficult to effect than the commonly used infiltration and nerve block methods. That is to say, the procedure generally followed has consisted in first injecting a few drops of an anesthetic into the flexure of the mucous membrane adjacent the tooth to be anesthetized, then (employing a conventional dental drill) drilling a small hole through the hard cortical or outer layer of the alveolar process of the maxillary bone, such hole being located between the root of the tooth to be anesthetized and that of the adjoining tooth, near the root apices. Upon penetration to the soft or medullary section of the bone, the drill is withdrawn from the hole, the needle of a hypodermic syringe introduced thereinto, and the anesthetic thereby injected into said medullary portion. However, it is extremely difficult to locate the small hole beneath the gum tissue with the hypodermic needle once the drill is withdrawn; and unless the needle be of substantially the same diameter as the drill, the anesthetic solution tends to back out of the hole around the needle and much of it is thereby lost.

A few attempts have been made to improve upon the above described technique but so far as I am aware all of the resulting devices have required the use of two hands to manipulate them, and they have either been so unwieldy as to be impractical or they have merely sought to improve the common procedure of drilling the hole and injecting the fluid by means of separate instruments through the provision of means to facilitate the relocation of the hole with the hypodermic needle after the drill has been withdrawn.

In contradistinction thereto, the present invention provides a unitary drill and injection instrument so constructed and arranged that it may be facilely employed with the standard hand-piece of the usual dental engine, and may be manipulated with but one hand to not only cause the drill to penetrate the maxillary bone to the medullary section thereof, but also, without withdrawing the drill from the hole so formed, may effect injection of the desired quantity of anesthetic or other liquid into such section. The operation is continuous although sequential, and with there being no necessity for probing with a separate hypodermic needle to locate the drilled hole, it is comparatively simple and rapid. The possibility of the injected fluid escaping from the hole and thus failing to accomplish its intended function is also substantially eliminated.

One illustrative example of a device constructed and arranged in accordance with the invention is shown in the accompanying drawings constituting a part of this specification, in which like reference characters designate like parts throughout the views, and in which:

Figure 1 is a front elevational view of the instrument, with a conventional dental hand-piece shown in operative relation thereto;

Fig. 2 is a side elevational view of the parts shown in Fig. 1, as seen from the right thereof;

Fig. 3 is a central vertical sectional view of the device, on approximately the plane indicated by the line 3—3 in Fig. 1 looking in the direction of the arrows, and with a conventional anesthetic-containing Carpule in operative position therein;

Fig. 4 is an enlarged vertical sectional view at right angles to Fig. 3 and taken approximately on the plane indicated by the line 4—4 in Fig. 2;

Fig. 5 is a horizontal cross sectional view, on approximately the plane indicated by the line 5—5 in Fig. 3, looking down, and with the Carpule omitted;

Fig. 6 is a sectional-plan view, on the plane indicated by the line 6—6 in Fig. 3, looking upwards;

Fig. 7 is an enlarged vertical sectional view of the lower portion of the drill element, on the same plane as Fig. 4 and looking in the same direction; and Fig. 8 is a similarly enlarged sectional-elevational view of a slightly modified form of drill, looking in the same direction as Fig. 3.

Referring to the said drawings in detail, the instrument comprises a body member 10 having a base portion 11 provided with a pair of parallel upwardly projecting tubular extensions or barrels 12 and 13, open at their upper ends, and the latter of which is adapted to receive the nose portion of a dental hand-piece 14. As best shown in Fig. 3, the chuck of the said hand-piece receives and grips a spindle 15 disposed axially of the barrel 13 and provided with an enlarged lower portion 16 which is journaled in the base 11 of the body member 10. The lower face of the said base 11 is recessed as at 17 to house a gear train comprising a spur gear 18 rigid with the spindle 15, an idler gear 19, and a gear 20 which is integral with or rigidly carried by a shaft 21 that is disposed coaxially of the barrel 12 and journaled in the base portion 11 of the body member 10. The gears of the train are maintained in position in the recess 17 by a cover plate 22 which is secured to the base 11 by a thumb screw 23, the stem of which may conveniently provide a journal for the idler gear 19.

As best shown in Figs. 3 and 4, the upper end of the gear shaft 21 is threaded as at 25 for detachable securement to the head 26 of an inverted thimble member 27, which is rotatably disposed in the barrel 12. The portion of the shaft 21 below the gear 20 extends through the cover plate 22 and is threaded as at 28 for readily detachable attachment of the drill element 29, which will be more fully described later. The shaft 21 is provided with an axial bore 30 extending from end to end thereof, in which bore a tubular pin 31 is removably disposed. This pin projects somewhat beyond the upper end of the shaft 21, and the upper end of the pin is beveled as at 32, while the lower end of said pin carries a spherical head 33 adapted to engage a hemispherical seat 34 formed in the lower end face of the shaft 21.

The open upper end of the barrel 12 is closed by a readily removable cap 35 having a split lower portion whereby it may be clamped in operative position on the said barrel by a clamping screw 36 engaged with a pair of ears 37 carried by the cap. The cap is provided with an axial bore 38 in which is slidably mounted a rod 39 having heads 40 and 41 at its respective ends, the former of which preferably is removable for assembly and disassembly purposes. The rod 39 is engaged by an intermittent grip device for step-by-step advancement thereof in one direction, such device being here shown as a one-way clutch of the cramping type comprising a dog member 42 having an aperture 43 embracing the rod and being of slightly larger diameter than it, whereby the dog may slide freely upon the rod when in a position normal to the rod axis, whereas the periphery of the aperture will crampingly engage the rod when the dog is canted slightly relative thereto, as shown in Figs. 2 and 3.

For imparting such movements, as well as movements of translation, to the dog whereby to effect intermittent advancement of the rod 39, the upper end of a link 45 is pivotally connected to the dog by a screw 46 and the lower end of such link is pivotally connected by a screw 47 to an ear 48 of a manually operable lever 49, which may be conviently pivotally supported on the cap 35 between the ears 37 thereof by the screw 36. As will be readily understood, pressural movement of the said lever from the full line position to the broken line position thereof shown in Fig. 3 will not only cant the dog and clutch it to the rod 39 but will also bodily move such elements downwardly. A coil spring 50 surrounds the rod 39 between the cap 35 and dog 42, for returning the dog, link and lever to their normal positions following release of pressure upon the lever, during which movements the dog slides freely upon the rod, which remains in its advanced position.

The drill element 29 mentioned above comprises a body portion 51 having a threaded socket 52 for engagement with the threaded end 28 of the gear shaft 21, and the bottom of said socket is provided with a hemispherical seat 53 adapted for sealing engagement with the lower portion of the spherical head 33 of the tubular pin 31, see Fig. 4. An elongated stem 54 of small diameter extends from the lower end of the body 51, which stem has its lower end tapered or rounded as at 55 to a point 56. At one side however, this pointed end portion of the stem is flattened or beveled as at 57, thereby providing cutting edges 58, see Fig. 8. The body and stem are provided with a continuous axial duct 59 which at its upper end communicates with the bore of the tubular pin 31, and at its lower end terminates in an angular portion 60 opening through the beveled face 57 of the drill point.

A short distance below the juncture of the stem 54 with the body 51, the stem is provided with a stop and sealing flange 61 the upper face of which is normal to the stem axis and provides a sharp corner 63 at its juncture with the stem. The lower surface of the said flange is curved or tapered as at 64, and through engagement with the gum when the drill breaks through the cortical layer of bone serves to limit the penetration of the drill into the medullary section thereof and also to seal the hole against the escape of the anesthetic fluid around the outside of the drill.

Since in practice the drill stems 54 are of a diameter on the order of $\frac{1}{32}$ of an inch, there is appreciable danger of their being broken in use. To localize such breakage if and when it occurs, in the form shown in Fig. 7 the stem 54 is of uniform diameter throughout its length but that portion 59' of its axial duct that extends from the flange 61 to the drill point is made of lesser diameter than the portion of the duct above the flange. Thus, the stem wall throughout the latter portion is thinner and weaker than in the lower section of the drill, with the weakest point being at the sharp corner 63 where the flange 61 joins the stem. As a result it is practically certain that any breakage which may occur will take place at this point, or at least in the section between the body 51 and flange 61.

The same result may be accomplished by the slightly modified form of drill element shown in Fig. 8, wherein the diameter of the duct 59 is uniform throughout the length of the element but the diameter of that portion 54' of the stem between the flange 61 and body 51 is made smaller, thus weakening the stem above the flange. Of course, a combination of the two constructions may be employed if desired. In any case, if breakage occurs the flange 61 will be outside the gum tissue and the separated portion of the drill stem may be readily extracted from the hole by merely grasping the flange and withdrawing the broken stem section.

The barrel 12 and cap 35 provide a chamber in which a standard Carpule or similar anesthetic container 65 may be disposed, as shown in Figs. 3 and 4. As is well known, a conventional Carpule comprises a glass or plastic tube, open at one end and closed at the other by a cap of thin relatively soft metal 66, and having a rubber or analogous resilient plug 67 tightly but slidably disposed in the open end above the liquid contents 68.

To condition the present device for use, after the drill 29 has been so attached to the shaft 21 as to firmly compress the pin head 33 between its seats 34 and 53, the cap 35 is removed from the barrel 12 and a Carpule 65 is inserted into the thimble 27 and forced down therein to cause the beveled end 32 of the tubular pin 31 to penetrate the soft metal cap 66 of the Carpule and extend into the liquid 68, as shown in Fig. 4. The rod 39 carried by the barrel cap 35 having been withdrawn to its outermost limit, the said cap is replaced and clamped on the barrel 12 and the finger lever 49 manipulated to advance the rod 39 until its lower head 41 engages the Carpule plug 67. The instrument is then attached to the handpiece 14 by introducing the nose of the latter into the barrel 13 and tightening its chuck upon the spindle 15.

The drilling is performed in substantially the same manner as heretofore, with the gum preferably being initially anesthetized by the injection of a few drops of anesthetic solution therein, close to the tooth to be worked upon. However, when the drill has penetrated to the medullary section of the maxillary bone, it is not withdrawn from the hole but instead injection of the anesthetic fluid into the said medullary section is immediately effected by merely pressing upon the lever 49 with the index or middle finger of the hand which is holding the instrument. Such movement of said lever to the broken line position shown in Fig. 3, through link 45 lowers the dog 42 and rod 39 thereby forcing the Carpule plug 67 downwardly and expelling a predetermined quantity of the liquid 68 through the tubular pin 31 and duct 59 of the drill into the bone section. During this operation the flange 61 of the drill stem is pressed tightly against the gum tissue, thereby effecting a seal which prevents the injected liquid from backing out of the hole around the drill.

Upon release of the finger pressure on the lever 49 the spring 50 will return it and the dog 42 to their initial positions but since during such movement the dog is unclutched from the rod 39, the rod will remain in its advanced position, ready for another operation. The parts are so designed that ordinarily a single manipulation of lever 49 will eject a quantity of liquid sufficient to effect the purpose in view, but of course if necessary or desirable the lever may be pressed a plurality of times before withdrawal of the drill from the hole.

During the drilling operation the power supplied by the dental engine is transmitted from the clutch of the handpiece 14 to the spindle 15 and thence through the gear train 18, 19, 20 to shaft 21, drill 29 and thimble member 27 which member, together with the Carpule 65 disposed therein, is thus rotated in the barrel 12. While not absolutely necessary for successful operation of the device, such rotation of the Carpule is desirable because the tubular pin 31 which has penetrated the Carpule cap 66 rotates with the shaft 21. When such penetration is initially effected the metal of the cap 66 remains closely engaged with the peripheral surface of the pin and provides a seal therewith which prevents the escape of liquid about the pin, and this seal is effectively maintained so long as there is no relative movement between the pin and cap. However, if the Carpule were to remain stationary while the pin rotates with the shaft 21 the seal might be destroyed and thereby permit leakage of the liquid about the pin when pressure is exerted thereon by the rod 39 and plug 67.

The instrument may be readily disassembled and reassembled in a minimum of time for purposes of cleaning, sterilization and/or repair; and the construction of the drill element 29 is such that its cuttings do not work their way up into the duct 59, whereby it is unnecessary to employ a stylet in the duct to prevent clogging thereof and which would have to be removed in order to effect injection of the liquid.

What is claimed is:

1. A dental instrument for effecting intraosseous fluid injections, comprising a body member having a chamber adapted to house a receptacle containing the fluid to be injected; a shaft rotatably and non-slidably journaled in said body member below said chamber and provided with a longitudinal passage communicating with the chamber; a drill element carried by said shaft and having a longitudinal duct communicating with said shaft passage; means for rotating the shaft, whereby said drill element may penetrate a bone to the medullary section thereof; and means in said chamber engageable with a portion of a fluid-containing receptacle disposed therein and operable by the hand holding the instrument immediately upon said penetration of the drill element to said bone section to expel fluid from said receptacle and force it through said shaft passage and drill duct into said bone section.

2. A dental instrument for effecting intraosseous fluid injections, comprising a body member having a chamber adapted to house a receptacle containing the fluid to be injected; a shaft rotatably and non-slidably journaled in said body member below said chamber and provided with an axial passage communicating with the chamber; a drill element carried by said shaft and having a longitudinal duct communicating with said shaft passage; means for rotating the shaft, whereby said drill element may penetrate a bone to the medullary section thereof; means in said chamber pressurally engageable with a portion of a fluid-containing receptacle disposed therein whereby to force fluid from such receptacle into said medullary bone section through said shaft passage and drill duct; and manually operable means connected to said receptacle-engaging means and arranged for actuation by a digit of the hand holding the instrument whereby to intermittently actuate said receptacle-engaging means and thereby effect successive expulsions of the fluid.

3. A dental instrument for effecting intraosseous fluid injections, comprising a body member having a chamber adapted to house a receptacle containing the fluid to be injected; a shaft journaled in said body member and provided with an axial passage communicating with said chamber; a drill element carried by said shaft and having a longitudinal duct communicating with said shaft passage; means for rotating the shaft, whereby said drill element may penetrate a bone to the medullary section thereof; means slidably entering said chamber and engageable with a portion of a fluid-containing receptacle disposed therein to impel fluid from such receptacle through said shaft passage and drill duct into said medullary bone section; and an intermittent grip device connected to said impelling means and volitionally operable by a digit of the hand holding the instrument to effect step-by-step advancement of such means into the chamber whereby to induce successive expulsions of the fluid.

4. A dental instrument for effecting intraosseous fluid injections, comprising a body member having a chamber adapted to house a receptacle containing the fluid to be injected; a shaft journaled in said body member and provided with an axial passage for receiving the fluid from a receptacle disposed in said chamber; a drill element carried by said shaft and having a longitudinal duct communicating with said shaft passage; means for rotating the shaft, whereby said drill element may penetrate a bone to the medullary section thereof; a rod slidably entering said chamber and engageable with a portion of a fluid-containing receptacle disposed therein to expel fluid from such receptacle and force it through said shaft passage and drill duct into said medullary bone section; and means for inducing intermittent advancement of said rod into the chamber to effect successive expulsions of the fluid, such means comprising a manually operable lever carried by a portion of the body member in position for actuation by a digit of the hand holding the instrument, and a one-way clutch element engaging said rod and operatively connected to said lever for actuation thereby.

5. A dental instrument for effecting intraosseous fluid injections, comprising a body member having a chamber adapted to house a receptacle containing the fluid to be injected; a shaft journaled in said body member and provided with an axial bore communicating with said chamber; a tubular member disposed in said bore and projecting into the chamber whereby it may puncture a wall of a fluid-containing receptacle introduced therein and conduct fluid from such receptacle; a drill element attached to said shaft and having an axial duct communicating with said tubular member; means for rotating said shaft whereby the drill element may penetrate a bone to the medullary section thereof and manually operable means in said chamber pressurally engageable with a portion of a fluid-containing receptacle disposed therein to expel fluid from such receptacle and force it through said tubular member and drill duct to said medullary bone section.

6. A dental instrument for effecting intraosseous fluid injections, comprising a body member having a chamber; a shaft rotatably mounted in said body member and provided with an axial passage communicating with said chamber; a thimble member attached to the shaft and rotatably disposed in the chamber, for receiving a receptacle containing the fluid to be injected; a drill element attached to said shaft and having a longitudinal duct communicating with the shaft passage; means for rotating the shaft whereby said drill element may penetrate a bone to the medullary section thereof; and means in the chamber pressurally engageable with a portion of a fluid-containing receptacle disposed in said thimble member whereby to expel fluid from such receptacle and force it into said medullary bone section through said shaft passage and drill duct.

7. A dental instrument for effecting intraosseous fluid injections, comprising a body member having a cylindrical chamber; a shaft rotatably mounted in said body member and provided with an axial bore communicating with said chamber; a thimble member attached to said shaft and rotatably disposed in the chamber, for receiving a receptacle containing the fluid to be injected; a tubular member disposed in said shaft bore and projecting into the thimble member, whereby it may puncture a wall of a fluid-containing receptacle introduced into the thimble and extend into such receptacle; a drill element attached to said shaft and having an axial duct communicating with the passage of said tubular member; means for rotating the shaft, whereby the drill element carried thereby may penetrate a bone to the medullary section thereof; and manually operable means in the other end of said chamber for engaging a portion of a fluid-containing receptacle disposed in said thimble member whereby to expel fluid from such receptacle and force it through said tubular member and drill duct to said medullary bone section.

8. A dental instrument for effecting intraosseous fluid injections, comprising a body member having a pair of adjacent barrels, one of which is arranged to receive a portion of a dental hand-piece, and the other of which provides a chamber for housing a receptacle containing the fluid to be injected; a shaft rotatably mounted in said body member below said chamber and provided with an axial passage communicating with the chamber; a drill element attached to said shaft and having an axial duct communicating with said shaft passage; means connectible to a dental hand-piece entered into the first mentioned barrel, for rotating said shaft whereby the drill element carried thereby may penetrate a bone to the medullary section thereof; and means in said chamber pressurally engageable with a portion of a fluid-containing receptacle disposed therein, whereby to expel fluid from such receptacle and force it through said shaft passage and drill duct to said medullary bone section.

9. A dental instrument for effecting intraosseous fluid injections, comprising a body member having a pair of adjacent parallel barrels, one of which is arranged to receive a portion of a dental hand-piece, and the other of which provides a chamber adapted to house a receptacle containing the fluid to be injected; a shaft rotatably mounted in said body member and provided with an axial passage communicating with said chamber; a drill element attached to said shaft and having an axial duct communicating with said shaft passage; a spindle journaled in said body member and extending into the first mentioned barrel for driving engagement with a hand-piece entered therein; power transmitting connections comprising a gear train between said spindle and shaft for rotating the latter, whereby said drill element may penetrate a bone to the medullary section thereof; and means in said chamber pressurally engageable with a portion of a fluid-containing receptacle disposed therein, whereby to expel fluid from such receptacle and force it through said shaft passage and drill duct to said medullary bone section.

References Cited in the file of this patent

UNITED STATES PATENTS

| 1,539,637 | Bronner | May 26, 1925 |
| 1,770,634 | Smith | July 15, 1930 |

FOREIGN PATENTS

| 144,535 | Austria | Feb. 10, 1936 |